United States Patent Office 3,507,874
Patented Apr. 21, 1970

3,507,874
3-THIOPHENECARBOXYLIC ACID HYDRAZIDES
Real Laliberte, Laval, Quebec, Canada, assignor to Ayerst, McKenna & Harrison, Limited, St. Laurent, Montreal, Quebec, Canada, a corporation of Canada
No Drawing. Filed Oct. 8, 1968, Ser. No. 765,971
Int. Cl. C07d 63/08
U.S. Cl. 260—293.4
7 Claims

ABSTRACT OF THE DISCLOSURE

There are disclosed herein 3-thiophenecarboxylic acid hydrazides substituted in position 2 with aminophenyl or subsituted aminophenyl groups, in position4 with the imino group, and in position 5 with methyl, phenyl or substituted phenyl groups. The hydrazide group is substituted with two lower alkyl groups which may also be joined together to form a piperidino group together with the nitrogen to which they are attached. There are also disclosed the correspondingly substituted intermediate 2,4-thiophenedicarboxylic acid ester hydrazides. The compounds are useful as anthelmintic and amoebicidal agents, and methods for their preparation and use are also disclosed.

---

This invention relates to novel derivatives of 3-thiophenecarboxylic acid hydrazides, to processes used for their preparation and intermediates used in these processes.

More specifically, this invention relates to 3-thiophenecarboxylic acid hydrazides of Formula I,

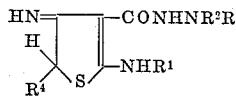

(I)

in which $R^1$ represents a phenyl group or a substituted phenyl group, for example, the 4-chlorophenyl or 4-methoxyphenyl group; $R^2$ and $R^3$ each represent a lower alkyl group, for example, a methyl or ethyl group, or $R^2$ and $R^3$ together represent —$(CH_2)_5$—, thus forming a piperidino ring; and $R_4$ represents a methyl group, a phenyl group or a substituted phenyl group, for example, a 4-methoxyphenyl group.

The 3-thiophenecarboxylic acid hydrazide of this invention have been found to possess anthelmintic activity, especially against *Syphacia obvelata*, in standard pharmacological tests, for example, in a procedure similar to that described by J. S. Steward, Parasitology, 45, 242 (1955).

When the compounds of this invention are employed as anthelmintic agents in warm-blooded animals, e.g. mice alone or in combination with pharmacologically acceptable carriers, the proportion of which is determined by the solubility and chemical nature of the compounds, chosen route of administration and standard biological practice. For example, they may be administered orally in solid form containing such excipients as starch, milk sugar, certain types of clay and so forth. They may also be administered orally in the form of solutions or suspensions, and the latter are most advantageously prepared by dissolving the compounds of this invention in the minimum amount of dimethyl sulfoxide, diluting such a solution with water, if necessary in the presence of a suspending agent such as, for example, gum arabic. In the treatment of horses it is most advantageous to dilute the compounds of this invention in the dry state with an excipient such as, for example, lactose, and to distribute the premix thus obtained into the feed of the horse.

The dosage of the present therapeutic agents will vary with the form of administration and the particular compound chosen. Furthermore, it will vary with the particular host under treatment. Generaly, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects. In the treatment of horses and of pets dosage levels of the compounds of this invention from 100 to 500 mg. per kilogram body weight per day may be employed, although as aforementioned variations will occur. However, dosage levels in the range about 200 mg. per kilogram body weight per day are most desirably employed in order to achieve effective results. Such medication is administered once and the animal is then observed for a period of a few days. Treatment may be repeated in the same manner as described above if the desired results have not been obtained after the first administration.

The 3-thiophenecarboxylic acid hydrazides of this invention of Formula I in which $R^4$ represents a methyl group may be prepared by the process illustrated by the following formulae (X represents a halogen atom, for example, chlorine or bromine, and Met represents an alkali metal atom, for example, sodium):

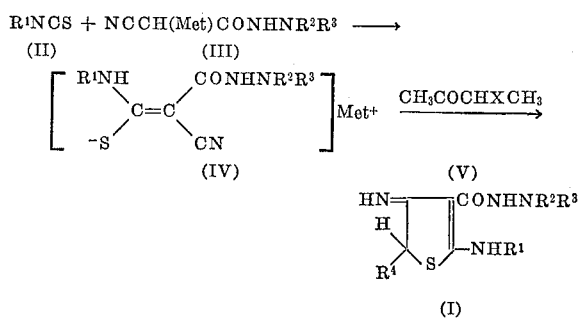

More specifically, the compounds of this invention of Formula I in which $R^4$ represents a methyl group are prepared by reacting together in solution of a lower alkanol, preferably ethanol, an isothiocyanate of the formula $R^1NCS$ (II) in which $R^1$ is as defined above, with substantially one molar equivalent of an alkali metal salt, preferably the sodium salt, of an appropriate cyanoacetic acid hydrazide of Formula III in which $R^2$ and $R^3$ are as defined above, prepared as described below, to yield the corresponding alkali metal salt of the 3-amino-2-cyano-3-mercaptoacrylic acid hydrazide derivative of Formula IV in which $R^1$, $R^2$, $R^3$ and Met are as defined above. The latter compound may be isolated, but such isolation is not necessary, and the reaction mixture, or the alkali salt of the intermediate of Formula IV in a solution of lower alkanol, may be treated directly with substantially one molar equivalent of 3-chloro- or 3-bromo-2-butanone described by P. J. C. Fierens, Bull. Soc. Chim. Belges, 64, 772 (1955) and E. F. J. Janetsky and P. E. Verkade, Rec. Trav. Chim., 65, 691 (1945), respectively.

Subsequent neutralization of the reaction mixture readily affords the compounds of Formula I in which $R^4$ represents methyl.

It is interesting to note the unusual course of this latter reaction. During the course of this reaction, the 3-chloro- or 3-bromo-2-butanone molecule is fragmented in such a way that only two of the four original carbon atoms are incorporated into the reaction product, the compounds of Formula I in which $R^4$ represents methyl.

The preferred appropriate cyanoacetic acid hydrazides of Formula III used in the above process are cyanoacetic acid 2,2-dimethylhydrazide, cyanoacetic acid 2,2-diethylhydrazide and N-piperidinocyanoacetamide. The preparation of cyanoacetic acid dimethylhydrazide is described by E. G. Howard et al., J. Am. Chem. Soc., 81, 4355 (1959) and the latter two hydrazide derivatives may be readily prepared by using equivalent amounts of diethylhydrazine, described by R. A. Rowe and L. F. Audrieth, J. Am. Chem. Soc., 78, 563 (1956), and N-aminopiperidine, described by G. M. Omietanski et al., J. Am. Chem. Soc., 78, 3874 (1956), respectively, instead of dimethylhydrazine in the preparation of cyanoacetic acid dimethylhydrazide, cited above.

The preferred isothiocyanates used in the above process are phenylisothiocyanate, described by F. B. Dains et al., Org. Syn., coll. vol. 1 (2nd ed., 1941) p. 447, 4-chlorophenyl isothiocyanate, described by F. B. Dains et al., Univ. Kansas Sci. Bull., 13, 1 (1922); Chem. Abstr., 17, 543 (1923), and 4-methoxyphenyl isothiocyanate, described by K. H. Slotta and H. Dressler, Chem. Ber., 63, 888 (1930).

The 3-thiophenecarboxylic acid hydrazides of this invention of Formula I, in which $R^4$ represents a phenyl or substituted phenyl group, are prepared from the intermediate IV by the process illustrated by the following formulae in which $R^4$ is phenyl or substituted phenyl, $R^5$ represents a lower alkyl group for example, an ethyl group, X is a halogen atom, for example, a bromine atom and $R^1$, $R^2$, $R^3$ are as described above.

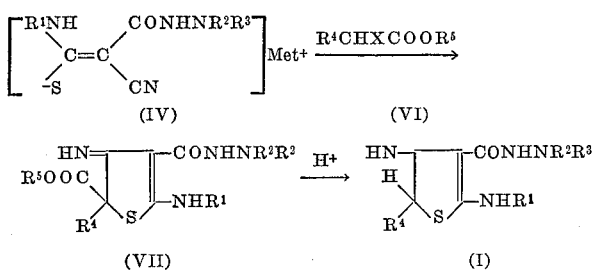

More specifically, the compounds of this invention of Formula I in which $R^4$ is a phenyl or a substituted phenyl group are prepared by treating the reaction mixture of the alkali salt of the intermediate of Formula IV with substantially one molar equivalent of an appropriate α-halophenylacetic acid lower alkyl ester, $R^4CHXCOOR^5$ in which $R^4$, X and $R^5$ are as described above, to yield the 2,4-thiophenedicarboxylic acid ester hydrazide of Formula VII. The latter compound affords the compounds of this invention of Formula I in which $R^4$ represents a phenyl or a substituted phenyl on treatment with a strong acid, preferably hydrochloric acid.

The preferred appropriate α-bromophenylacetic acid lower alkyl esters used in the above process are α-bromophenylacetic acid ethyl ester, described by C. O. Guss, J. Am. Chem. Soc., 71, 3460 (1949), and α-bromo-4-methoxyphenylacetic acid ethyl ester, prepared by the bromination method of B. W. Howk and S. M. McElvain, J. Am. Chem. Soc., 54, 282 (1932) from 4-methoxyphenylacetic acid ethyl ester, described by R. S. Livshits et al., J. Gen. Chem. (U.S.S.R.), 17, 1671 (1947); Chem. Abstr., 42, 2606 (1948).

When the 3-thiophenecarboxylic acid hydrazides of Formula I, in which $R^1$, $R^2$, $R^3$ and $R^4$ are as originally described above, are treated with an excess of trifluoroacetic anhydride, 3-thiophenecarboxylic acid hydrazides of Formula VIII are obtained

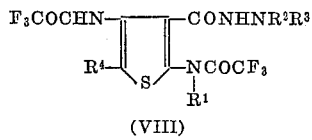

in which $R^1$, $R^2$, $R^3$ and $R^4$ are as originally described.

A noteworthy aspect of this invention is the discovery that the 2,4-thiophenedicarboxylic ester hydrazides of Formula VII and the 3-thiophenecarboxylic acid hydrazides of Formula VIII, described above, exhibit utility as amebicidal agents, especially active against *Entamoeba histolytica*, in standard pharmacological tests, for example, in a test procedure similar to that described by P. P. Laidlaw et al., Parasitology, 20, 207 (1928).

When the 2,4-thiophenedicarboxylic acid ester hydrazides of Formula VII and the 3-thiophenecarboxylic acid hydrazides of Formula VIII are employed as amoebicidal agents in warm-blooded animals, for example, in hamsters or in rats, according to the method described in Experimental Chemotherapy, vol. 1, pp. 420–424, Academic Press (1963), they may be administered orally to rats in the form of suspensions formulated with appropriate suspending agents, for example, with gum arabic.

When giving the compounds to hamsters the preferred method of administration is by intraperitoneal injection of the dose to be used in 0.1 ml. of an aqueous vehicle. Such suspensions are preferably prepared by dissolving the compounds in a minimum amount of dimethyl sulfoxide and diluting that solution with water, if necessary in the presence of gum arabic, to the required concentration. All the above operations have to be carried out with sterile materials and under sterile conditions so as to obtain sterile suspensions.

In the production of certain vaccines it is preferred to use the monkey as the host animal and such monkeys have to be kept under observation for a period of time of several weeks before using them in the actual production of vaccines. During that period the monkeys infected with *Entamoeba histolytica* may be treated with the compounds of this invention by the oral route as described above.

The dosage of the present therapeutic agents will vary with the form of administration and the particular compound chosen. Furthermore, it will vary with the particular host under treatment, Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

Generally, treatment of small animals is carried out by oral administration as described above with doses of the compounds of this invention of from 2 to 20 mg. per kilogram body weight per day, for a period of four days, and in monkeys by oral administration of the compounds of this invention in doses of from 5 to 50 mg. per kilogram body weight per day for periods of four days. The preferred dosage levels for small animals are 4 to 10 mg. per kilogram body weight per day, and for monkeys 15 to 25 mg. per kilogram body weight per day. Individual variations will occur, but the above dosage levels are the ones most desirable employed in order to achieve effective results.

The following examples will illustrate this invention:

EXAMPLE 1

In a 250 ml. round bottomed, three-necked flask, fitted with a mechanical stirrer, a condenser and a dropping funnel, a mixture of sodium (0.69 g., 0.03 mole) in ethanol (60 ml.), the cyanoacetic acid hydrazide, cyanoacetic acid 2,2-dimethylhydrazide (3.8 g., 0.03 mole) and the isothiocyanate, phenylisothiocyanate (4.05 g., 0.03 mole) is heated under reflux for one hour. (The intermediate, 3-anilino-2-cyano-3 - mercaptoacrylic acid 2,2-dimethylhydrazide, may be isolated at this point by cooling the reaction mixture to room temperature, adding an excess of aqueous acetic acid to free the intermediate from its corresponding sodium salt. Extraction with chloroform and subsequent evaporation of the chloroform extract yields the intermediate as an oil $\gamma_{max.}^{CHCl_3}$ 2200 and 1635 cm.$^{-1}$)

After completion of the heating, 3-bromo-2-butanone (4.55 g., 0.03 mole) is added and the mixture is heated under reflux for another two hours. The reaction mixture is cooled, acidified with acetic acid (2 ml.), filtered and the filtrate is concentrated to dryness. The residue is taken up with ethyl acetate and water. The ethyl acetate layer is washed with water, dried over anhydrous sodium sulphate and concentrated to dryness to give a residual foam. The residue is crystallized from benzene and then isopropanol to yield the 3-thiophenecarboxylic acid hydrazide, 2-anilino-4,5-dihydro-4-imino-5-methylthiophene-3-carboxylic acid 2,2-dimethylhydrazide (I; $R^1$=phenyl, $R^2$, $R^3$ and $R^4$=methyl), M.P. 197–200° C., $\gamma_{max.}^{CHCl_3}$ 3485, 3340, 3270, 3180, 1630 and 1535–1600 cm.$^{-1}$ In the same manner, but using an equivalent of 4-chlorophenyl isothiocyanate or 4-methoxyphenylisothiocyanate instead of phenyl isothiocyanate, the corresponding 2-(4-chlorophenyl)amino- and 2-(4-methoxyphenyl)amino-4,5-dihydro-4-imino-5-methyl-thiophene - 3 - carboxylic acid 2,2 - dimethylhydrazides, are obtained respectively.

In the same manner, but using an equivalent amount of cyanoacetic acid 2,2-diethylhydrazide instead of cyanoacetic acid 2,2-dimethylhydrazide and using the appropriate isothiocyanate, phenyl isothiocyanate, 4-chlorophenyl isothiocyanate or 4-methoxyphenyl isothiocyanate, 2-anilino-, 2-(4-chlorophenyl) amino- and 2-(4-methoxyphenyl)amino-4,5 - dihydro-4-imino-5 - methylthiophene-3-carboxylic acid 2,2 - diethylhydrazides are obtained, respectively.

In the same manner, but using an equivalent amount of N-piperidinocyanoacetamide instead of cyanoacetic acid 2,2-dimethylhydrazide and using the appropriate isothiocyanate, phenyl isothiocyanate, 4-chlorophenyl isothiocyanate or 4 - methoxy - phenyl isothiocyanate, 2-anilino-, 2-(4-chlorophenyl)amino- and 2 - (4-methoxyphenyl)amino - 4,5 - dihydro - 4 - imino - 5 - methyl-N-piperidino-thiophene-3-carboxamides, are obtained.

The 3-thiophenecarboxylic acid hydrazides described in this example may also be prepared in the same manner described in this example, but an equivalent amount of 3-chloro-2-butanone is used instead of 3-bromo-2-butanone.

EXAMPLE 2

To a 500 ml., three necked, round bottomed flask fitted with a mechanical stirrer, a condenser and a dropping funnel, 0.15 mole of sodium in 300 ml. of absolute ethanol, 0.15 mole of the cyanoacetic acid hydrazine, cyanoacetic acid 2,2-dimethylhydrazide, and 0.15 mole of the isothiocyanate, phenyl isothiocyanate, are added. The mixture is refluxed for one hour. α-Bromophenyl-acetic ethyl ester (0.12 mole) is then added. The mixture is refluxed for one hour, cooled, acidified with acetic acid and the solid formed is collected off. The filtrate is evaporated to dryness and the residue is taken into ethyl acetate and washed with water. On evaporation of the solvent, an oil is obtained. The oil is dissolved in hot isopropanol and a gum is precipitated by addition of hexane. Addition of hexane is continued until a clear solution is obtained. This supernatant solution is separated and concentrated to yield an oil which is crystallized from benzene by addition of hexane alone. This solid is collected off and crystallized from benzene and from 2-methyl-2-butanol to yield the 2,4-thiophenedicarboxylic acid hydrazide, 5-anilino-2,3-dihydro-3-imino-2-phenyl-2,4-thiophenedicarboxylic acid 2-ethyl ester 4-(2,2-dimethylhydrazide) (VII, $R^1$ and $R^4$=phenyl, $R^2$ and $R^3$=methyl, $R^5$=ethyl), M.P. 83–85° C., $\gamma_{max.}^{CHCl_3}$ 3470, 3250, 3180, 1725, 1635 and 1589 cm.$^{-1}$ In the same manner, but using an equivalent of 4-chlorophenyl isothiocyanate or 4-methoxyphenyl isothiocyanate instead of phenyl isothiocyanate, the corresponding 2,4-thiophenedicarboxylic acid hydrazides, 5-(4-chlorophenyl)amino- and 5-(4-methoxyphenyl)amino-2,3-dihydro-3-imino-2-phenyl-2,4-thiophenedicarboxylic acid 2-ethyl ester 4-(2,2-dimethylhydrazide, are obtained, respectively.

In the same manner, but using an equivalent amount of cyanoacetic acid 2,2-diethylhydrazide instead of cyanoacetic acid 2,2-dimethylhydrazide and using the appropriate isothiocyanate, phenyl isothiocyanate, 4-chlorophenyl isothiocyanate or 4-methoxyphenyl isothiocyanate, the 2,4-thiophenedicarboxylic acid ester hydrozides, 5-anilino-, 5-(4-chlorophenyl)amino- and 5-(4-methoxyphenyl)amino-2,3-dihydro-3-imino-2-phenyl - 2,4 - thiophenedicarboxylic acid 2-ethyl ester 4-(2,2-diethylhydrozide), are obtained.

In the same manner, but using an equivalent amount of N-piperidinocyanoacetamide instead of cyanoacetic acid 2,2-dimethylhydrazide and using the appropriate isothiocyanate, described above, the 2,4-thiophenedicarboxylic acid ester hydrazides, 5-anilino-, 5-(4-chlorophenyl)amino- and 5-(4-methoxyphenyl)amino-2,3-dihydro-3-imino - 2 - phenyl-4-(N-piperidinocarboxamido)-2-thiophenecarboxylic acid ethyl ester, are obtained. The 5-anilino derivative obtained in this manner has M.P. 101–103° C.

The corresponding 2-(4-methoxyphenyl) derivatives of the 2,4-thiophenedicarboxylic acid ester hydrazides described above in this example, are prepared in the same manner described above for the corresponding 2-phenyl derivatives, except that an equivalent amount of α-bromo-4-methoxyphenylacetic acid ethyl ester is used instead of α-bromophenylacetic acid ethyl ester.

EXAMPLE 3

In a 250 ml. round bottomed flask, fitted with a mechanical stirrer, and a condenser, a solution of the 2,4-thiophenedicarboxylic acid ester hydrazide, 5-anilino-2,3-dihydro-3-imino-2-phenyl-2,4-thiophenedicarboxylic acid 2-ethyl ester 4- (2,2 - dimethylhydrazide) (3 g. 0.007 mole) prepared as described in Example 2, in 1:1 hydrochloric acid-water (60 ml.) is heated on a steam bath with stirring for two hours. The reaction mixture is cooled with ice-water and solid sodium carbonate is added to neutralize hydrochloric acid. The neutralized solution is extracted with ethyl acetate and the ethyl acetate extracts are washed with water, dried over anhydrous sodium sulphate and concentrated to dryness to give a residue which is crystalized from benzene and from isopropyl alcohol to yield 2-anilino-4,5-dihydro-4-imino-5-phenyl-3-thiophenecarboxylic acid 2,2-dimethylhydrazide (I, $R^1$ and $R^4$=phenyl and $R^2$ and $R^3$=methyl), M.P. 191–193° C., $\gamma_{max.}^{CHCl_3}$ 3470, 3265, 3220, 1635, 1595-1535 cm.$^{-1}$ In the same manner, but using an equivalent amount of one of the remaining 2,4-thiophenedicarboxylic acid ester hydrazides, described in Example 2, instead of 5-anilino-2,3-dihydro-3-imino - 2 - phenyl-2,4-thiophenedicarboxylic acid 2-ethyl ester 4-(2,2-dimethylhydrazide), the 3-thiophenecarboxylic acid hydrazines, 2-(4-chlorophenyl)amino- and 2-(4-methoxyphenyl)amino-4,5-dihydro-4-imino-5-phenyl-3-thiophenecarboxylic acid 2,2-dimethylhydrazide, 2-anilino-, 2-(4-chlorophenyl)amino-, 2-(4-methoxyphenyl)amino-4,5-dihydro - 4 - imino-5-(4-methoxyphenyl)-3-thiophenecarboxylic acid 2,2-dimethylhydrazide; 2-anilino-, 2-(4-chlorophenyl)amino-, 2-(4-methoxyphenyl)amino-4,5-dihydro-4-imino-5-phenyl and -5-(4-methoxyphenyl)-3-thiophenecarboxylic acid, 2,2-diethylhydrazide; 2-anilino-, 2-(4-chlorophenyl)amino-, 2-(4 - methoxyphenyl)amino-4,5-dihydro-4-imino-5-phenyl- and -5-(4 - methoxyphenyl)-N-piperidino-3-carboxamide, are obtained.

EXAMPLE 4

In a 150 ml. round bottomed flask, 2-anilino-4,5-dihydro-4-imino-5-methyl-N - piperidinothiophene - 3 - carboxamide (12 g., 0.0364 mole), M.P. 275–277° C., prepared as described in Example 1, is dissolved in trifluoroacetic anhydride (50 ml.). The clear solution is left at room temperature for five hours. The solid formed is collected on a Buchner funnel and rinsed with ether to remove the excess of trifluoroacetic anhydride. The solid is recrystallised from isopropanol.

A pure sample of the product, 5-methyl-2-(N-phenyl-2,2,2-trifluoroacetamido)-N - piperidino - 4 - (2,2,2 - trifluoroacetamido)thiophene - 3 - carboxamide (VIII; $R^1$= phenyl, $R^2$ and $R^3$, together=—$(CH_2)_5$— and $R^4$= methyl) M.P. 221–224° C., is obtained by sublimation.

In the same manner, but using an equivalent amount of the appropriate 3-thiophenecarboxylic acid hydrazide, prepared as described in Example 1, instead of 2-anilino-4,5-dihydro-4-imino-5-methyl-N - piperidinothiophene - 3-carboxamide, 5 - methyl - 2-(N-phenyl-, -2-(N-[4-chlorophenyl]-, -2-(N-[4 - methoxyphenyl] - 2,2,2 - trifluoroacetamido) - 3 - thiophenecarboxylic acid 2,2 - dimethylhydrazides and the corresponding 2,2-diethylhydrazides, and also, 5 - methyl - 2 - (N-[4-chlorophenyl]-, -2-(N-[4-methoxyphenyl]-2,2,2-trifluoroacetamido) - N-piperidino-4 - (2,2,2 - trifluoroacetamido)-3-thiophenecarboxamides, are obtained.

In the same manner, but using an equivalent amount of the appropriate 3-thiophenecarboxylic acid, prepared as described in Example 3, instead of 2-anilino-4,5-dihydro-4-imino-5-methyl-N-piperidinothiophene - 3 - carboxamide, the corresponding 5-phenyl- and 5-(4-methoxyphenyl) - 2 - (N-phenyl-, -2-(N-[4-chlorophenyl]-, -2-(N-[4 - methoxyphenyl] - 2,2,2 - trifluoroacetamido) - 4-(2,2,2 - trifluoroacetamido) - 3-thiophenecarboxylic acid 2,2-dimethylhydrazides and the corresponding 2,2-diethylhydrazides, and also, 5-phenyl- and 5-(4-methoxyphenyl)- 2-(N-phenyl-, -2-(N-[4-chlorophenyl]-, -2-(N-[4 - methoxyphenyl]-2,2,2-trifluoroacetamido)-4-(2,2,2 - trifluoroacetamido) - N - piperidino-3-thiophenecarboxamides, are obtained.

I claim:
1. A compound selected from those of the formula

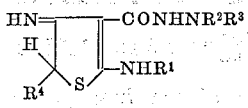

wherein $R^1$ represents phenyl or 4-chlorophenyl or 4-methyoxyphenyl; $R^2$ and $R^3$ each represents lower alkyl or, taken together, represent

and $R^4$ represents methyl, phenyl or 4-methoxyphenyl.

2. 2 - anilino - 4,5 - dihydro - 4 - imino - 5 - methylthiophene-3-carboxylic acid 2,2-dimethylhydrazide.

3. 2 - anilino - 4,5 - dihydro - 4 - imino - 5 - phenylthiophene-3-carboxylic acid 2,2-dimethylhydrazide.

4. A compound selected from those of the formula

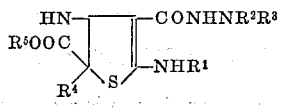

wherein $R^1$ represents phenyl or 4-chlorophenyl or 4-methoxyphenyl; $R^2$ and $R^3$ each represents lower alkyl or, taken together, represent

$R^4$ represents phenyl or 4-methoxyphenyl; and $R^5$ represents lower alkyl.

5. 5 - anilino - 2,3 - dihydro - 3 - imino - 2 - phenyl-2,4 - thiophenedicarboxylic acid 2-ethyl ester 4-(2,2-dimethylhydrazide).

6. 5 - methyl - 2 - (N - phenyl - 2,2,2 - trifluoroacetamido) - N - piperidino - 4 - (2,2,2 - trifluoroacetamido) thiophene-3-carboxamide.

7. 5 - anilino - 2,3 - dihydro - 3 - imino - 2 - phenyl - 4-(N-piperidino-carboxamide)-2 - thiophenecarboxylic acid ethyl ester.

References Cited
UNITED STATES PATENTS
3,303,201    2/1967    Stecker _____ 260—332.2

HENRY R. JILES, Primary Examiner
S. D. WINTERS, Assistant Examiner

U.S. Cl. X.R.
260—332.2, 294, 465.4, 465